US012693765B2

(12) United States Patent
Li

(10) Patent No.: US 12,693,765 B2
(45) Date of Patent: Jul. 28, 2026

(54) TOUCH DISPLAY DEVICE

(71) Applicant: Wuhan China Star Optoelectronics Semiconductor Display Technology Co., Ltd., Wuhan (CN)

(72) Inventor: Fei Li, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 9 days.

(21) Appl. No.: 17/776,395

(22) PCT Filed: Apr. 22, 2022

(86) PCT No.: PCT/CN2022/088516
§ 371 (c)(1),
(2) Date: Dec. 18, 2024

(87) PCT Pub. No.: WO2023/197360
PCT Pub. Date: Oct. 19, 2023

(65) Prior Publication Data
US 2025/0103168 A1     Mar. 27, 2025

(30) Foreign Application Priority Data
Apr. 15, 2022     (CN) .......................... 202210399782.5

(51) Int. Cl.
*G06F 3/041*          (2006.01)
*G06F 3/044*          (2006.01)
(52) U.S. Cl.
CPC .......... *G06F 3/0443* (2019.05); *G06F 3/0412* (2013.01); *G06F 3/0448* (2019.05)

(58) Field of Classification Search
None
See application file for complete search history.

(56) References Cited

U.S. PATENT DOCUMENTS

2018/0047804 A1     2/2018  Zhou et al.
2022/0326832 A1*   10/2022  Lee ......................... G06F 3/044

FOREIGN PATENT DOCUMENTS

CN          109116643  A       1/2019
CN          109917959  A       6/2019
CN          112860122  A       5/2021
(Continued)

OTHER PUBLICATIONS

Chinese Office Action issued in corresponding Chinese Patent Application No. 202210399782.5 dated Dec. 25, 2024, pp. 1-10.
(Continued)

*Primary Examiner* — Brian M Butcher
(74) *Attorney, Agent, or Firm* — Nathan & Associates Patent Agents Ltd.; Menachem Nathan

(57)          ABSTRACT

A touch display device includes a touch display panel and a touch display chip. The touch display panel includes a plurality of touch units, a plurality of first touch pins, a plurality of touch signal lines connecting the touch units to the first touch pins, and one or more touch detection pins connected to the first touch pins. The touch display chip includes a plurality of second touch pins corresponding to and connected to the first touch pins, and one or more bonding pins corresponding to and connected to the one or more touch detection pins.

20 Claims, 6 Drawing Sheets

(56)　　　　　References Cited

FOREIGN PATENT DOCUMENTS

| CN | 113380864 | A | 9/2021 |
| CN | 113535003 | A | 10/2021 |

OTHER PUBLICATIONS

International Search Report in International application No. PCT/CN2022/088516, mailed on Jan. 11, 2023.
Written Opinion of the International Search Authority in International application No. PCT/CN2022/088516, mailed on Jan. 11, 2023.

* cited by examiner

200

50

TOUCH DISPLAY DEVICE

FIELD OF INVENTION

The present disclosure relates to the technical field of display, and particularly to a touch display device.

BACKGROUND

A touch function has become one of standard configurations of most display devices. Capacitive touch display devices are widely used, and their basic principle is to use tools such as fingers or stylus to generate capacitance with the touch display devices, and to use electrical signals formed by changes in capacitance before and after touch to confirm whether the touch display devices are touched and to confirm touch coordinates.

Currently, if there is a problem with touch signal lines of a touch display device in a manufacturing process, touch electrodes connected to the touch signal lines will fail, causing the touch display device to be scrapped. Therefore, it is necessary to detect a touch function of the touch display device. However, adding a touch detection circuit to the touch display device will increase a frame size of the touch display device.

Therefore, it is necessary to provide a technical solution to solve the problem that adding a touch detection circuit in the touch display device will increase the frame size of the touch display device.

SUMMARY OF DISCLOSURE

Technical Problems

A purpose of the present disclosure is to provide a touch display device with a reduced frame.

Solutions for Solving Problems

Technical Solutions

The present disclosure provides a touch display device, the touch display device includes:

a touch display panel provided with a display area and a
    bonding area, and the touch display panel includes:
    a plurality of touch units located in the display area;
    a plurality of first touch pins located in the bonding
      area; and
    a plurality of touch signal lines connecting the touch
      units to the first touch pins; and
    one or more touch detection pins located in the bonding
      area and connected to the first touch pins; and
  a touch display chip disposed in the bonding area and
    including:
    a plurality of second touch pins corresponding to and
      connected to the first touch pins; and
    one or more bonding pins corresponding to and con-
      nected to the one or more touch detection pins.

BENEFICIAL EFFECTS OF THE PRESENT DISCLOSURE

Beneficial Effects

In the touch display device provided by the present disclosure, the one or more touch detection pins are disposed at positions of redundant pins of a conventional touch display panel, and replace the redundant pins of the conventional touch display panel. The one or more touch detection pins are connected to the first touch pins. The first touch pins are connected to the touch units through the touch signal lines. The touch detection pins are connected to the one or more bonding pins of the touch display chip. Therefore, the touch detection pins can be used for touch detection before the touch display chip is bonded to the touch display panel, which is beneficial to detect whether the touch display panel is defective. After the touch display chip is bonded to the touch display panel, the one or more touch detection pins are connected to the one or more bonding pins of the touch display chip to jointly support the touch display chip, so that the touch detection pins also function as the redundant pins of the conventional touch display panel, thereby saving a space required for separately disposing the touch detection pins and reducing a frame size of the touch display device.

BRIEF DESCRIPTION OF DRAWINGS

Description of Drawings

Figure 1:
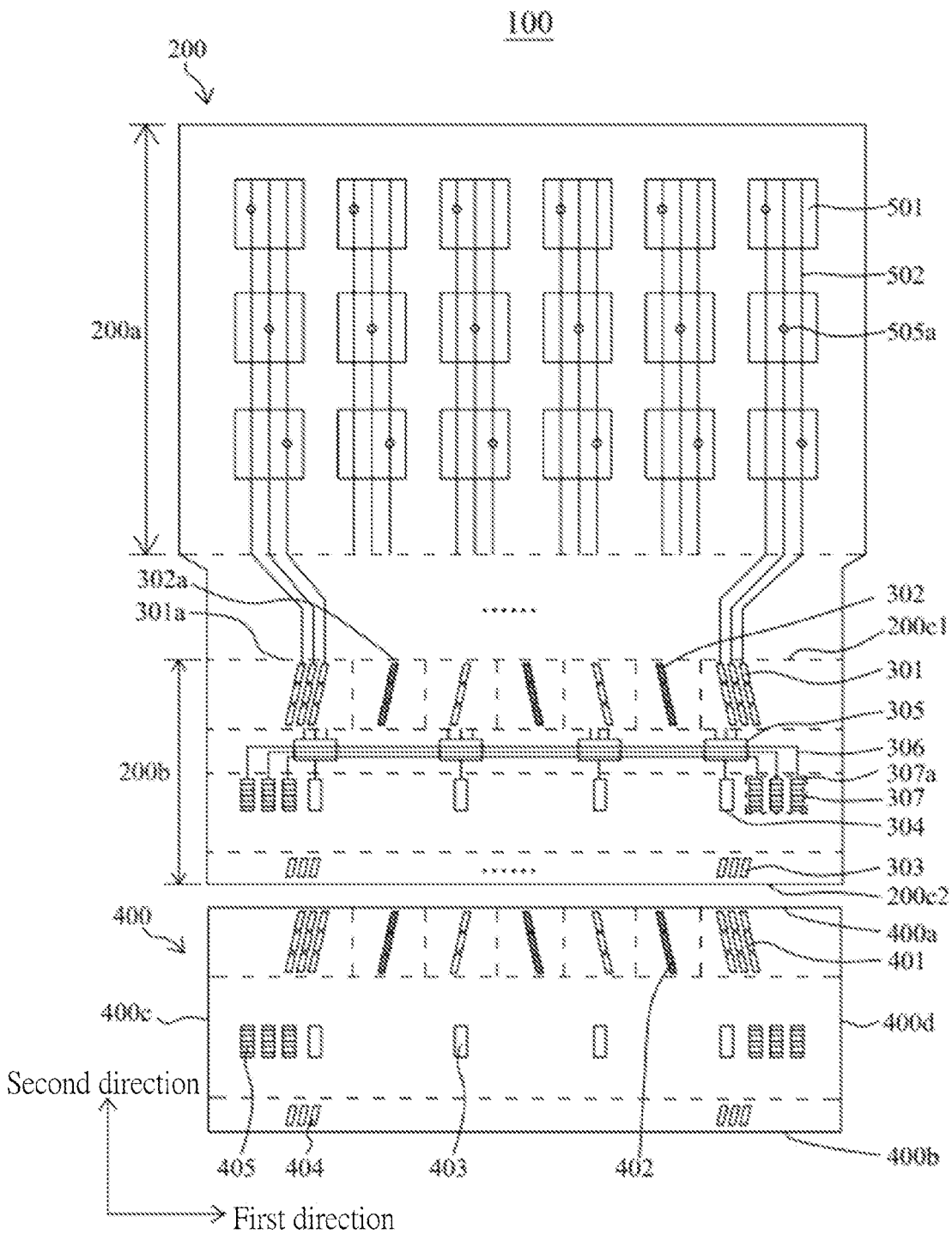

FIG. 1 is a schematic plan view of a touch display device according to an embodiment of the present disclosure.

Figure 2:
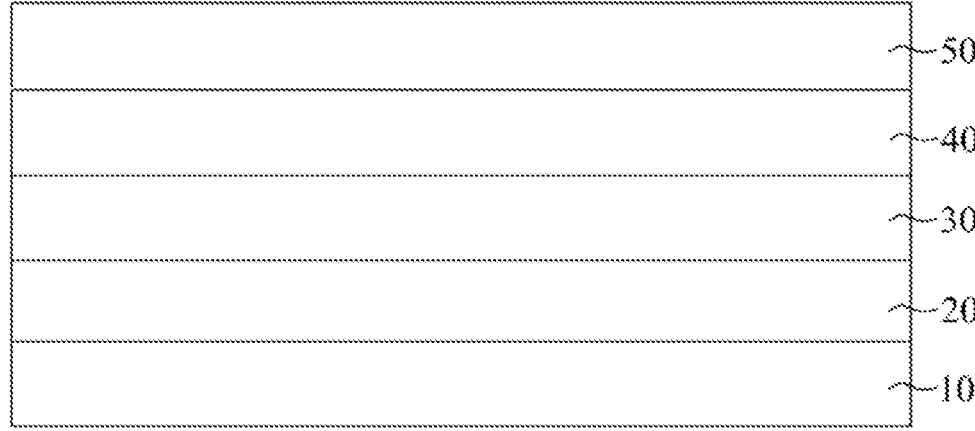

FIG. 2 is a schematic cross-sectional view of a touch display panel according to an embodiment of the present disclosure.

Figure 3:
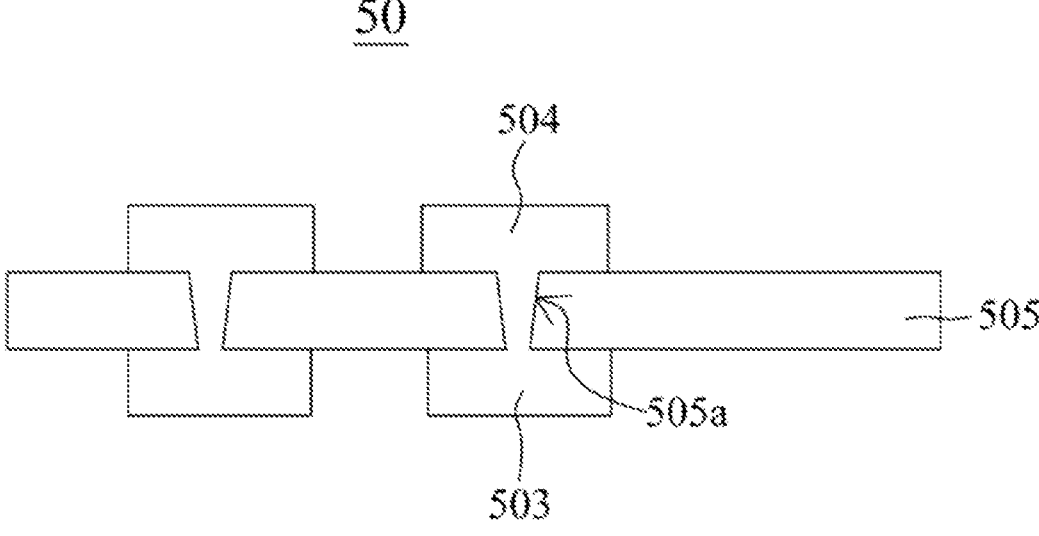

FIG. 3 is a schematic cross-sectional view of a touch layer of the touch display panel according to an embodiment of the present disclosure.

Figure 4:
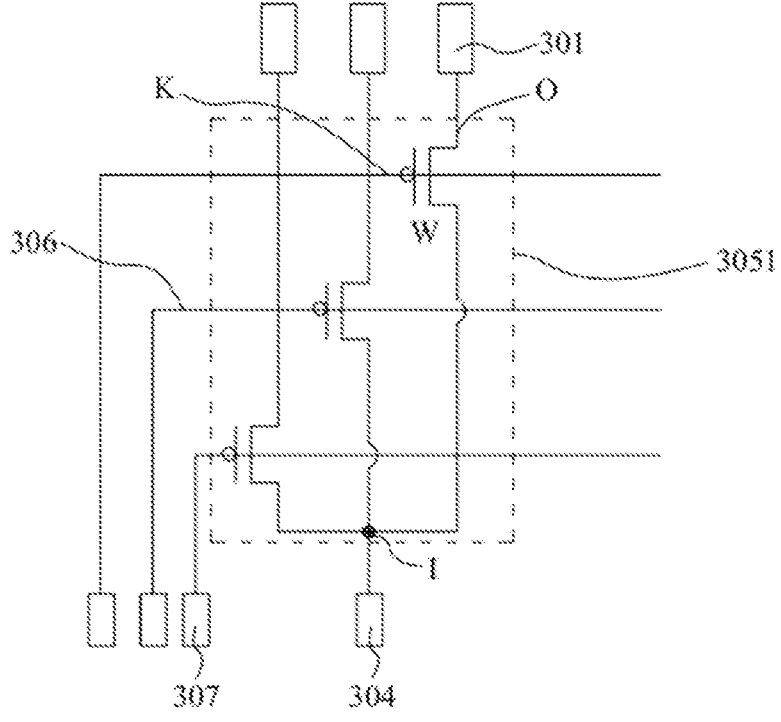

FIG. 4 is a partially enlarged schematic view of the touch display panel of FIG. 1.

Figure 5:
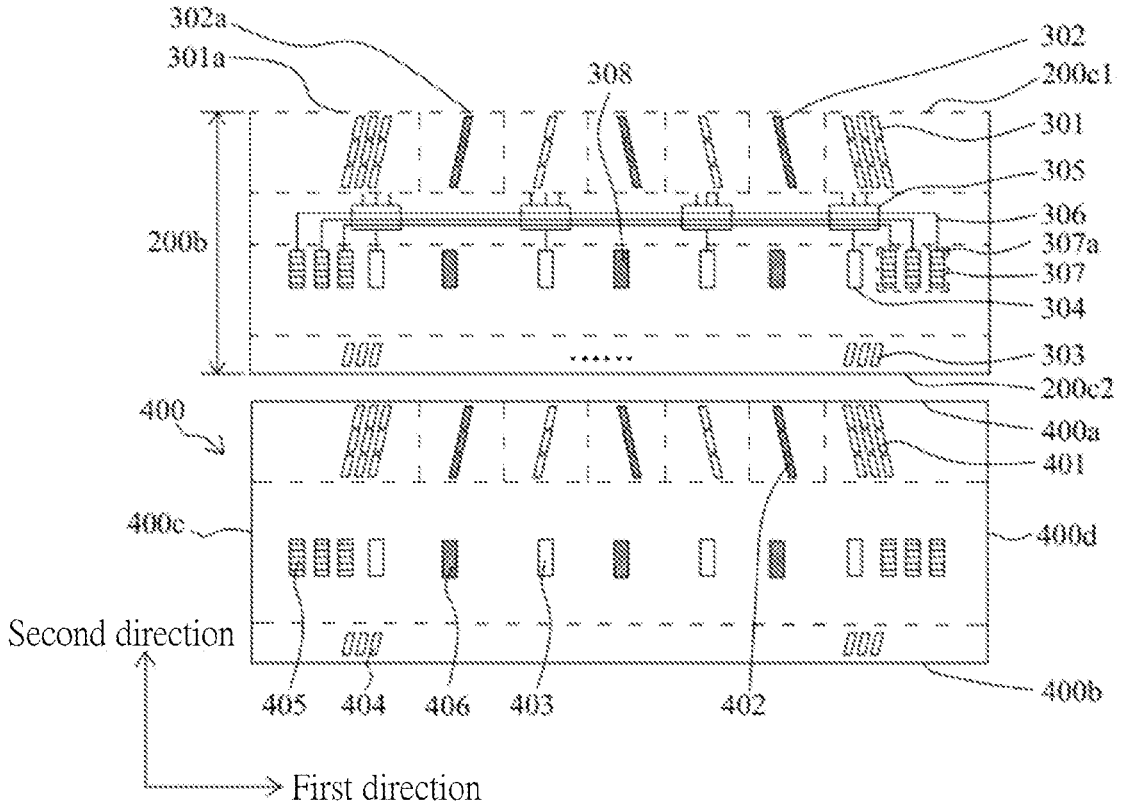

FIG. 5 is a schematic plan view of a bonding area of a touch display device according to another embodiment of the present disclosure.

Figure 6:
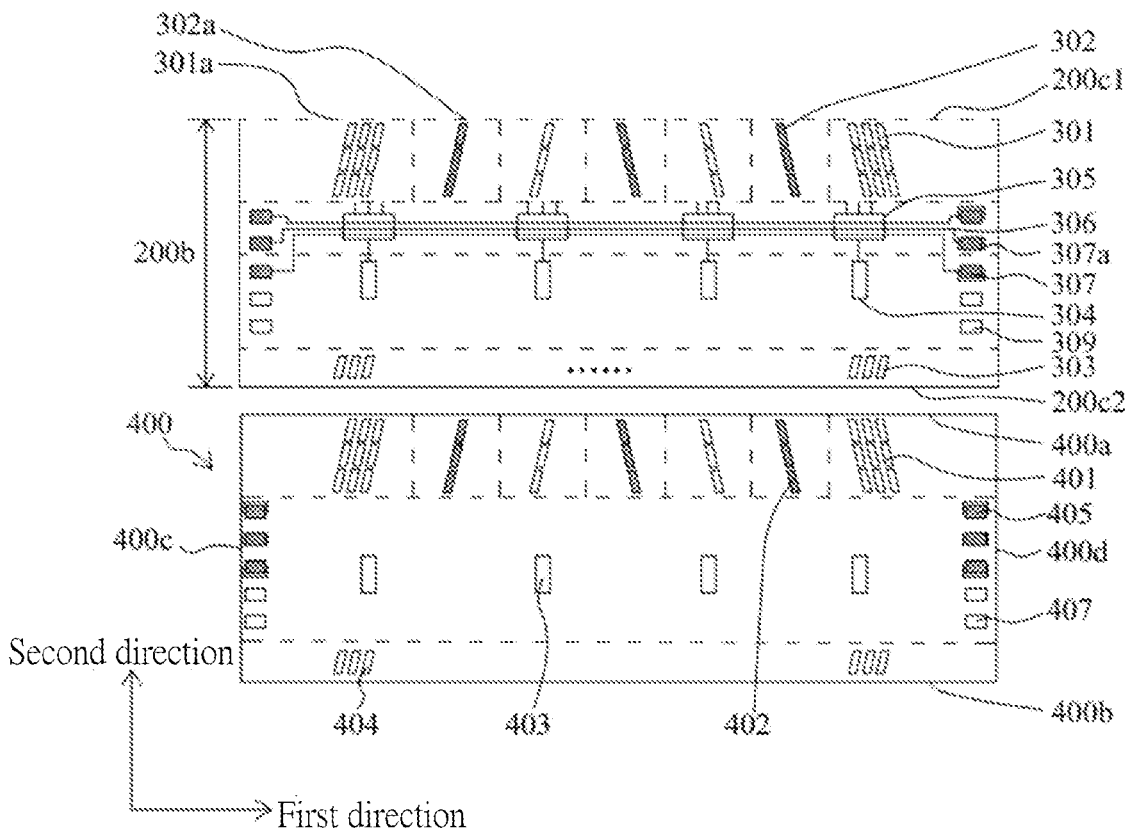

FIG. 6 is a schematic plan view of a bonding area of a touch display device according to another embodiment of the present disclosure.

Figure 7:
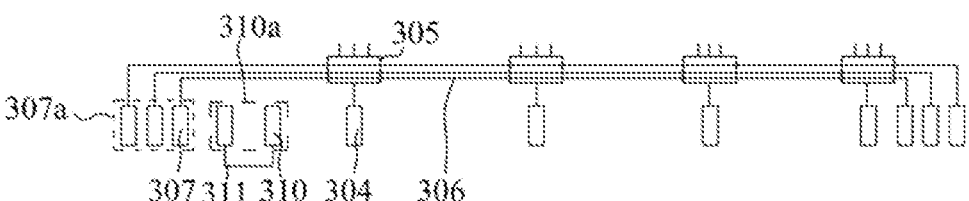
Figure 7:
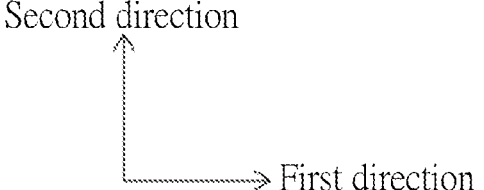

FIG. 7 is a schematic partial plan view of a bonding area of a touch display device according to another embodiment of the present disclosure.

Figure 8:
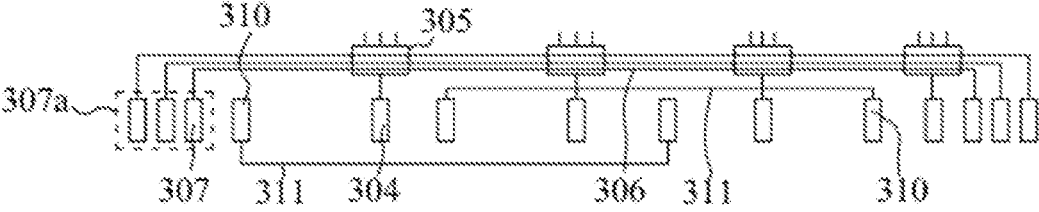
Figure 8:
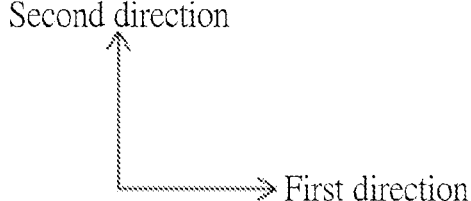

FIG. 8 is a schematic partial plan view of a bonding area of a touch display device according to yet another embodiment of the present disclosure.

DETAILED DESCRIPTION OF EMBODIMENTS

Embodiments of the Present Disclosure

Technical solutions in embodiments of the present disclosure will be clearly and completely described below in conjunction with accompanying drawings in the embodiments of the present disclosure. It is apparent that the described embodiments are merely some of the embodiments of the present disclosure and not all embodiments. All other embodiments obtained by those skilled in the art based on the embodiments of the present disclosure without creative labor are within claimed scope of the present disclosure.

Please refer to FIG. 1, which is a schematic plan view of a touch display device according to an embodiment of the present disclosure. A touch display device 100 comprises a touch display panel 200 and a touch display chip 400. The touch display panel 200 comprises a display area 200a and a bonding area 200b. The bonding area 200b is located on a side of the display area 200*a*. The touch display chip 400 is bonded to the bonding area 200*b* of the touch display panel 200.

Please refer to FIG. 2, which is a schematic cross-sectional view of a touch display panel according to an embodiment of the present disclosure. The touch display panel 200 further comprises a substrate 10, a thin-film transistor array layer 20, a light-emitting device layer 30, a thin-film encapsulation layer 40 and a touch control layer 50.

The substrate 10 is a flexible substrate, and the flexible substrate may be a polyimide film. It can be understood that the substrate 10 may also be a glass substrate.

The thin-film transistor array layer 20 is disposed on the substrate 10. The thin-film transistor array layer 20 comprises a plurality of metal layers and a plurality of insulating layers each disposed between two adjacent metal layers. The thin-film transistor array layer 20 further comprises a plurality of thin-film transistors, a plurality of data lines (not shown), and a plurality of scan lines (not shown).

The light-emitting device layer 30 is disposed on a side of the thin-film transistor array layer 20 away from the substrate 10. The light-emitting device layer 30 comprises a plurality of light-emitting devices arranged in an array and electrically connected to the thin-film transistors. The light-emitting devices are organic light-emitting diodes.

The thin-film encapsulation layer 40 is disposed on a side of the light-emitting device layer 30 away from the thin-film transistor array layer 20. The thin-film encapsulation layer 40 comprises two inorganic insulating layers and an organic insulating layer disposed between the two inorganic insulating layers.

The touch layer 50 is disposed on a surface of the thin-film encapsulation layer 40 away from the substrate 10. As shown in FIG. 1, the touch layer 50 comprises a plurality of touch units 501 and a plurality of touch signal lines 502. The touch units 501 are arranged in an array in the display area 200*a*. The touch signal lines 502 extend from the display area 200*a* to the bonding area 200*b*. Each of the touch signal lines 502 is electrically connected to one of the touch units 501.

Please refer to FIG. 3, which is a schematic cross-sectional view of a touch layer of the touch display panel according to an embodiment of the present disclosure. The touch layer 50 further comprises a first conductive layer 503, a second conductive layer 504, and an insulating layer 505 disposed between the first conductive layer 503 and the second conductive layer 504. The first conductive layer 503 is disposed on the thin-film encapsulation layer 40. The second conductive layer 504 is disposed on a side of the first conductive layer 503 away from the substrate 10.

The first conductive layer 503 comprises the touch signal lines 502. The second conductive layer 504 comprises the touch units 501. The touch units 501 are self-capacitance touch electrodes. Each of the touch signal lines 502 is electrically connected to one of the touch units 501 through one via hole 505*a* in the insulating layer 505.

The touch signal lines 502 and the touch units 501 may be made of a transparent conductive material. The touch signal lines 502 and the touch units 501 may also be formed as a metal grid.

Please refer to FIG. 1, the bonding area 200*b* has a first edge 200*c*1 and a second edge 200*c*2 opposite to each other in a second direction. The first edge 200*c*1 is close to the display area 200*a*. The second edge 200*c*2 is an edge of the bonding area 200*b* away from the display area 200*a*. The second direction is parallel to a direction from the display area 200*a* to the bonding area 200*b*.

The touch display panel 200 further comprises a plurality of first touch pins 301, a plurality of first display pins 302, and a plurality of first transmission pins 303. The first touch pins 301, the first display pins 302, and the first transmission pins 303 are all located in the bonding area 200*b*. Each of the touch signal lines 502 connects one touch unit 501 to one first touch pin 301. Each of the data lines connects one light-emitting device to one first display pin 302. The first transmission pins 303 are connected to a flexible printed circuit board (not shown) at least through wires or the like.

The first touch pins 301 and the first display pins 302 are disposed close to the first edge 200*c*1 of the bonding area 200*b*. The first touch pins 301 are same as the first display pins 302. That is, the first touch pins 301 and the first display pins 302 have a same shape and size, and are made of a same conductive layer.

The first touch pins 301 are divided into a plurality of first touch pin groups 301*a*. Each of the first touch pin groups 301*a* comprises a plurality of the first touch pins 301. The plurality of the first touch pins 301 in each of the first touch pin groups 301*a* are arranged in multiple rows. The multiple rows of the first touch pins in each of the first touch pin groups 301*a* are arranged side by side in the second direction.

The first display pins 302 are divided into a plurality of first display pin groups 302*a*. Each of the first display pin groups 302*a* comprises a plurality of the first display pins 302. The plurality of the first display pins 302 in each of the first display pin groups 302*a* are arranged in multiple rows. The multiple rows of the first touch pins in each of the first display pin groups 302*a* are arranged side by side in the second direction.

The first touch pin groups 301*a* and the first display pin groups 302*a* are alternately arranged in a first direction. The first direction intersects with the direction from the display area 200*a* to the bonding area 200*b*. Specifically, the first direction is perpendicular to the direction from the display area 200*a* to the bonding area 200*b*. It can be understood that an included angle between the first direction and the direction from the display area 200*a* to the bonding area 200*b* may also be greater than 0 degrees and less than 90 degrees.

The first transmission pins 303 are disposed close to the second edge 200*c*2. The first transmission pins 303 are arranged in a row and are arranged side by side in the first direction.

The touch display panel 200 further comprises one or more touch detection pins 304, one or more demultiplexing circuits 305, one or more control signal lines 306, and one or more first control pins 307. The touch detection pins 304, the demultiplexing circuits 305, the control signal lines 306, and the first control pins 307 are all located in the bonding area 200*b*.

Please refer to FIG. 4, which is a partially enlarged schematic view of the touch display panel of FIG. 1. Each of the demultiplexing circuits 305 comprises one or more demultiplexing units 3051. The number of the demultiplexing units 3051 may be one, two, or more.

Each of the demultiplexing units 3051 comprises a control terminal K, an input terminal I, and an output terminal O. The input terminal I of the demultiplexing unit 3051 is connected to one touch detection pin 304. The output terminal O of the demultiplexing unit 3051 is connected to one first touch pin 301. The control terminal K of the demultiplexing unit 3051 is connected to one control signal line 306. Each of the control signal lines 306 is connected to one first control pin 307.

Each of the demultiplexing units 3051 comprises two or more switching units W. A control terminal of each of the switching units W is connected to one control signal line 306. An input terminal of each of the switching units W is connected to one touch detection pin 304. An output end of each of the switching units W is connected to one first touch pin 301. The switching units W are P-type thin-film transistors. It can be understood that the switching units W may also be N-type thin-film transistors.

When a touch detection is performed, the demultiplexing units 3051 of the demultiplexing circuits 305 are turned on, and each of the demultiplexing circuits 305 connects one touch detection pin 304 to two or more first touch pins 301. When a touch detection signal is loaded to one touch detection pin 304, the touch detection signal can be transmitted to two or more first touch pins 301, so as to detect the touch signal lines 502 connected to the two or more first touch pins 301. This is beneficial to reduce the number of the touch detection pins 304, so as to save a space required for disposing the touch detection pins 304, thereby reducing a size of the bonding area 200*b*, and reducing a frame size of the touch display device 100.

Please refer to FIG. 1, the number of the touch detection pins 304 is multiple. The touch detection pins 304 are located on sides of the first touch pins 301 away from the display area 200*a*. The touch detection pins 304 are located between the first transmission pins 303 and the first touch pins 301. The touch detection pins 304 are arranged at equal intervals in the first direction.

Specifically, the touch detection pins 304 are arranged in a straight line in the first direction. The touch detection pins 304 are arranged in a row, and the touch detection pins 304 are located at a middle of the bonding area 200*b* in the second direction. The demultiplexing circuits 305 are located between the touch detection pins 304 and the first touch pins 301.

In this embodiment, the touch detection pins 304 are disposed at positions of redundant pins of a conventional touch display panel, which is beneficial to reduce a space required for separately disposing the touch detection pins 304, thereby reducing a frame size of the touch display device.

It can be understood that the touch detection pins 304 may also be arranged in multiple rows. The touch detection pins 304 may also be arranged in an arc in the first direction.

The first control pins 307 are located between the first transmission pins 303 and the first touch pins 301, and the one or more touch detection pins 304 are arranged in a row with the first control pins 307. And/or, the one or more touch detection pins 304 are adjacent to and are staggered with the first control pins 307, and the first control pins 307 are same as the touch detection pins 304.

Specifically, the first control pins 307 and the touch detection pins 304 are arranged in a row in the first direction. The first control pins 307 are divided into two first control pin groups 307*a*. In the first direction, the two first control pin groups 307 are located on opposite sides of the touch detection pins 304, respectively. The first control pins 307 are the same as the touch detection pins 304. That is, the first control pins 307 and the touch detection pins 304 have a same shape and size, and are made of a same conductive layer.

It can be understood that one or more first control pins 307 adjacent to the touch detection pins 304 may also be staggered with the touch detection pins 304. Alternatively, some of the first control pins 307 are arranged side by side with the touch detection pins 304, and some of the first control pins 307 are staggered with adjacent touch detection pins 304.

When a touch detection is performed on the touch display device 100, the touch display chip 400 loads touch signals to the first touch pins 301. When the touch display device 100 displays, the touch display chip 400 loads data signals to the first display pins 302.

The touch display chip 400 has a third edge 400*a*, a fourth edge 400*b*, a fifth edge 400*c*, and a sixth edge 400*d*. The third edge 400*a* and the fourth edge 400*b* are opposite to each other and extend in a length direction of the touch display chip 400. The fifth edge 400*c* and the sixth edge 400*d* are opposite to each other and extend in a width direction of the touch display chip 400. The fifth edge 400*c* is connected to the third edge 400*a* and the fourth edge 400*b*. The sixth edge 400*d* is connected to the third edge 400*a* and the fourth edge 400*b*.

The touch display chip 400 comprises a plurality of second touch pins 401, a plurality of second display pins 402, a plurality of bonding pins 403, a plurality of second transmission pins 404, and a plurality of second control pins 405.

The second touch pins 401 and the second display pins 402 are disposed close to the third edge 400*a* of the touch display chip 400. The second touch pins 401 are divided into a plurality of second touch pin groups. An arrangement of the second touch pin groups is same as an arrangement of the first touch pin groups 301*a*, which will not be described in detail herein. The second display pins 402 are divided into a plurality of second display pin groups. The second touch pin groups and the second display pin groups are alternately arranged in the first direction. An arrangement of the second display pin groups is same as an arrangement of the first display pin groups 302*a*, which will not be described in detail herein.

When the touch display chip 400 is bonded on the touch display panel 200, the second touch pins 401 are connected one-to-one to the first touch pins 301, and second display pins 402 are connected one-to-one to the first display pins 302.

An arrangement of the second transmission pins 404 is same as an arrangement of the first transmission pins 303. The second transmission pins 404 are disposed close to the fourth edge 400*b* of the touch display chip 400. The second transmission pins 404 are used as signal input pins of the touch display chip 400.

When the touch display chip 400 is bonded to the touch display panel 200, the second transmission pins 404 are connected one-to-one to the first transmission pins 303.

When the touch display device 100 is in a working state, the bonding pins 403 of the touch display chip 400 are not input with electrical signals. The bonding pins 403 support the touch display chip 400 to prevent the touch display chip 400 from being tilted when the touch display chip 400 is bonded to the touch display panel 200.

An arrangement of the bonding pins 403 is same as an arrangement of the touch detection pins 304. Specifically, the bonding pins 403 are arranged in a straight line in the first direction. The bonding pins 403 are located between the second touch pins 401 and the second transmission pins 404. The bonding pins 403 are located at a middle of the touch display chip 400 in the width direction.

When the touch display chip 400 is bonded to the touch display panel 200, the bonding pins 403 are connected one-to-one to the touch detection pins 304, so that the bonding pins 403 and the touch detection pins 304 jointly support the touch display chip 400.

The second control pins 405 and the bonding pins 403 are arranged in a row in the first direction. The second control pins 405 are divided into two second control pin groups, and the two second control pin groups are respectively located on opposite sides of the bonding pins 403 in the first direction. The second control pins 405 are same as the bonding pins 403. That is, the second control pins 405 and the bonding pins 403 have a same shape and size, and are made of a same conductive layer.

When the touch display chip 400 is bonded to the touch display panel 200, the second control pins 405 are connected one-to-one to the first control pins 307.

When the touch display device 100 is in the working state, the second control pins 405 transmit a constant voltage signal to the first control pins 307. The constant voltage signal is transmitted to the demultiplexing units 3051 of the demultiplexing circuits 305 through the control signal lines 306. The demultiplexing units 3051 are in an off state according to the constant voltage signal, so as to avoid interference to a touch function when the demultiplexing units 3051 are turned on.

When the switching units W are P-type thin-film transistors, the constant voltage signal may be a high-level voltage (VGH), and the constant voltage signal may also be a positive power supply voltage signal (i.e. AVDD). When the switching units W are N-type thin-film transistors, the constant voltage signal may be a low-level voltage (VGL), and the constant voltage signal may also be a negative power supply voltage signal (i.e. IOVCC).

Specifically, when the switching units W are P-type thin-film transistors, the constant voltage signal is a positive power supply voltage signal (i.e. AVDD). When the switching units W are N-type thin-film transistors, the constant voltage signal is a negative power supply voltage signal (i.e. IOVCC). When the touch display device has a double-tap or gesture wake-up function, and the touch display device is woken up from a sleep mode, this avoids that a high-level voltage (VGH) or a low-level voltage (VGL) power down, causing the demultiplexing units 3051 to be turned on and affecting the touch function.

It should be noted that when the touch display device does not have a double-tap or gesture wake-up function, the constant voltage signal may also be a high-level voltage (VGH) or a low-level voltage (VGL).

When the touch display device 100 is in the working state, the touch detection pins 304 are connected to the printed circuit board through an external circuit on the touch display panel. The printed circuit board loads high-level voltage signals to the touch detection pins 304 to reduce a leakage current of the switching units W.

It can be understood that when the touch display device 100 is in the working state, the touch detection pins 304 may not be input with electrical signals.

In this embodiment, a plurality of the touch detection pins are disposed at positions of redundant pins of a conventional touch display panel and replace the redundant pins of the conventional touch display panel. The touch detection pins are connected to the first touch pins. The first touch pins are connected to the touch units through the touch signal lines. The touch detection pins are connected to the bonding pins of the touch display chip. Therefore, before the touch display chip is bonded to the touch display panel, the touch detection pins can be loaded with touch detection signals to detect whether there is a short circuit or open circuit in the touch signal lines, which is beneficial to detect whether the touch display panel is defective. After the touch display chip is bonded to the touch display panel, the touch detection pins are connected to the bonding pins of the touch display chip to jointly support the touch display chip, so that the touch detection pins also function as the redundant pins of the conventional touch display panel, thereby saving a space required for separately disposing the touch detection pins and reducing a frame size of the touch display device.

Furthermore, the first control pins are disposed at the position of the redundant pins of the conventional touch display panel and replace the conventional redundant pins of the touch display panel. The second control pins replace redundant pins of a conventional touch display chip. This avoids a need to dispose separate pins to be connected to the printed circuit board to load signals to the demultiplexing circuits, thereby reducing the number of pins that need to be connected to the printed circuit board, simplifying a design of the touch display panel, and further reducing the frame size of the touch display device.

Please refer to FIG. 5, which is a schematic plan view of a bonding area of a touch display device according to another embodiment of the present disclosure. The touch display device shown in FIG. 5 is basically similar to the touch display device shown in FIG. 1. A difference is that when the touch display device 100 is in the working state, the bonding pins 403 are input with a preset voltage, and the bonding pins 403 transmit the preset voltage to the touch detection pins 304. The preset voltage is a high-level voltage, so as to reduce the leakage current of the switching units W.

In this embodiment, the touch display chip 400 further comprises one or more first redundant pins 406. The touch display panel 200 further comprises one or more second redundant pins 308. The one or more second redundant pins 308 are located in the bonding area 200*b*. The one or more second redundant pins 308 are connected one-to-one to the one or more first redundant pins 406.

The one or more first redundant pins 406 and the one or more binding pins 403 are arranged in a row,
and the one or more second redundant pins 308 and the one or more touch detection pins 304 are arranged in a row.

And/or, the one or more first redundant pins 406 are adjacent to and staggered with the one or more binding pins 403, and the one or more second redundant pins 308 are adjacent to and staggered with the one or more touch detection pins 304.

Specifically, the number of the first redundant pins 406 and the number of the second redundant pins 308 are both multiple and same. A plurality of the first redundant pins 406 and the bonding pins 403 are arranged in a row in the first direction. At least one first redundant pin 406 is disposed between two adjacent bonding pins 403. A plurality of the second redundant pins 308 and the touch detection pins 304 are arranged in a row in the first direction. At least one second redundant pin 308 is disposed between two adjacent touch detection pins 304.

It can be understood that the first redundant pins 406 may also be adjacent to and staggered with the bonding pin 403, and the second redundant pins 308 may also be adjacent to and staggered with the touch detection pins 304.

The first redundant pins 406 are same as the bonding pins 403. That is, the first redundant pins 406 have a same shape, size, and composition as the bonding pins. The second redundant pins 308 are same as the touch detection pins 304. That is, the second redundant pins 308 have a same shape, size, and composition as the touch detection pins 304.

In the touch display device of this embodiment, in addition to a connection between the touch detection pins and the bonding pins, and a connection between the first control pins and the second control pins, supporting the touch display chip, a connection between the first redundant pins and the second redundant pins also supports the touch display chip.

Please refer to FIG. 6, which is a schematic plan view of a bonding area of a touch display device according to another embodiment of the present disclosure. The touch display device shown in FIG. 6 is basically similar to the touch display device shown in FIG. 1. A difference is that the touch display panel 200 further comprises a plurality of third redundant pins 309. The third redundant pins 309 are divided into two third redundant pin groups. The two third redundant pin groups are respectively disposed along two opposite edges of the bonding area 200b in the first direction, and the third redundant pins 309 are arranged in the second direction. The second direction is parallel to the direction from the display area 200a to the binding area 200b.

The touch display chip 400 further comprises a plurality of fourth redundant pins 407. The fourth redundant pins 407 are divided into two fourth redundant pin groups. The two fourth redundant pin groups are respectively disposed along the fifth edge 400c and the sixth edge 400d of the touch display chip 400, and the fourth redundant pins 407 are arranged in the second direction. The fourth redundant pins 407 are connected one-to-one to the third redundant pins 309.

In this embodiment, the one or more third redundant pins 309 and the first control pins 307 are arranged in a row, and the second control pins 405 and the one or more fourth redundant pins 407 are arranged in a row. And/or, the one or more third redundant pins 309 are adjacent to and staggered with the first control pins 307, and the second control pins 405 are adjacent to and staggered with the one or more fourth redundant pins 407.

Specifically, the third redundant pins 309 and the first control pins 307 are arranged in a row in the second direction. The first control pins 307 are located on sides of the third redundant pins 309 close to the first touch pins 301.

The second control pins 405 and the fourth redundant pins 407 are arranged in a row in the second direction. The second control pins 405 are located on sides of the fourth redundant pins 407 close to the second touch pins 401.

It can be understood that the third redundant pins 309 may also be staggered with the first control pins 307, and the second control pins 405 may also be staggered with the fourth redundant pins 407.

In the touch display device of this embodiment, the third redundant pins 309 are connected to the fourth redundant pins 407 to further support the touch display chip 400. Furthermore, positions of the first control pins 307 in the touch display device of this embodiment are different from positions of the first control pins 307 shown in FIG. 1. And, positions of the second control pins 405 in the touch display device of this embodiment are also different from positions of the second control pins 405 shown in FIG. 1.

Please refer to FIG. 7, which is a schematic partial plan view of a bonding area of a touch display device according to another embodiment of the present disclosure. The touch display device shown in FIG. 7 is basically similar to the touch display device shown in FIG. 1. A difference is that the touch display panel 200 further comprises one or more pressure-bonding detection pin groups 310a. The one or more pressure-bonding detection pin groups 310a are located in the bonding area 200b. Each of the pressure-bonding detection pin groups 310a comprises two pressure-bonding detection pins 310 arranged in a row and connected to each other.

Specifically, the two pressure-bonding detection pins 310 of each of the pressure-bonding detection pin groups 310a and the touch detection pins 304 are arranged in a row in the first direction. Each of the pressure-bonding detection pin groups 310a is located between one first control pin group 307a and one touch detection pin 304 adjacent to the one first control pin group 307a. The touch detection pins 304 are not disposed between the two pressure-bonding detection pins 310 in each of the pressure-bonding detection pin groups 310a. The two pressure-bonding detection pins 310 in each of the pressure-bonding detection pin groups 310a are connected by a connecting wire 311.

Before the touch display chip 400 is bonded, some probes are pressure-bonded to the touch detection pins 304, and some probes are pressure-bonded to the two pressure-bonding detection pins 310 of one pressure-bonding detection pin group 310a, so as to detect whether the probes are successfully pressure-bonded to the touch detection pins 304. A principle of detecting whether the probes are successfully pressure-bonded to the touch detection pins 304 is as follows. If the two pressure-bonding detection pins 310 of one pressure-bonding detection pin group 310a are connected, pressure-bonding is successful. If the two pressure-bonding detection pins 310 of one pressure-bonding detection pin group 310a are disconnected, the pressure-bonding is unsuccessful. At this time, the probes need to pressure-bond the contact detection pins 304 again.

The pressure-bonding detection pins 310 are same as the touch detection pins 304. That is, the pressure-bonding detection pins 310 have a same shape and size as the touch detection pins 304, so as to increase accuracy of detecting whether the probes are successfully pressure-bonded to the touch detection pins 304.

Please refer to FIG. 8, which is a schematic partial plan view of a bonding area of a touch display device according to yet another embodiment of the present disclosure. The touch display device shown in FIG. 8 is basically similar to the touch display device shown in FIG. 7. A difference is that the touch display panel 200 comprises two or more pressure-bonding detection pin groups 310a. The touch detection pins 304 are disposed between the two pressure-bonding detection pins 310 in each of the pressure-bonding detection pin groups 310a, so as to further increase the accuracy of detecting whether the probes are successfully pressure-bonded to the touch detection pins.

Specifically, the touch display panel 200 comprises two pressure-bonding detection pin groups 310a, and one or more touch detection pins 304 are disposed between the two pressure-bonding detection pins 310 in each of the pressure-bonding detection pin groups 310a.

It should be noted that, the one or more pressure-bonding detection pin groups 310a in the touch display device shown in FIG. 8 or FIG. 7 may also be applied to the touch display device shown in FIG. 5 or FIG. 6.

The above description of the embodiments is only for helping to understand the technical solutions of the present disclosure and its core ideas. It should be understood by those skilled in the art that they can modify the technical solutions recited in the foregoing embodiments, or replace some of technical features in the foregoing embodiments with equivalents. These modifications or replacements do not cause essence of corresponding technical solutions to depart from the scope of the technical solutions of the embodiments of the present disclosure.

What is claimed is:

1. A touch display device, comprising:
a touch display panel comprising a display area and a bonding area, and further comprising:
  a plurality of touch units located in the display area;
  a plurality of first touch pins located in the bonding area;
  a plurality of touch signal lines connecting the touch units to the first touch pins; and
  one or more touch detection pins located in the bonding area and connected to the first touch pins; and
a touch display chip disposed in the bonding area and comprising:
  a plurality of second touch pins corresponding to and connected to the first touch pins; and
  one or more bonding pins corresponding to and connected to the one or more touch detection pins;
wherein the touch display panel further comprises:
a demultiplexing circuit comprising one or more demultiplexing units, wherein each of the demultiplexing units comprises a control terminal, an input terminal connected to one touch detection pin, and an output terminal connected to one first touch pin; and
one or more control signal lines, wherein each of the control signal lines is connected to the control terminal of one of the demultiplexing units.

2. The touch display device according to claim 1, wherein when the touch display device is in a working state, the one or more bonding pins are not input with an electrical signal.

3. The touch display device according to claim 1, wherein when the touch display device is in a working state, the one or more bonding pins are input with a preset voltage.

4. The touch display device according to claim 3, wherein
the touch display chip further comprises one or more first redundant pins arranged in a row with the one or more bonding pins; and
the touch display panel further comprises one or more second redundant pins located in the bonding area, corresponding to and connected to the one or more first redundant pins, and arranged in a row with the one or more touch detection pins.

5. The touch display device according to claim 3, wherein
the touch display chip further comprises one or more first redundant pins adjacent to and staggered with the one or more bonding pins; and
the touch display panel further comprises one or more second redundant pins located in the bonding area, corresponding to and connected to the one or more first redundant pins, and adjacent to and staggered with the one or more touch detection pins.

6. The touch display device according to claim 4, wherein the first redundant pins are same as the bonding pins, and the second redundant pins are same as the touch detection pins.

7. The touch display device according to claim 1, wherein
the touch display panel further comprises one or more first control pins connected to the one or more control signal lines; and
the touch display chip further comprises one or more second control pins corresponding to and connected to the one or more first control pins.

8. The touch display device according to claim 7, wherein
a plurality of the touch detection pins are arranged in a first direction and are arranged in a row with the first control pins, and the first direction intersects with a direction from the display area to the bonding area; and a plurality of the bonding pins are arranged in the first direction, are connected one-to-one to the touch detection pins, and are arranged in a row with the second control pins.

9. The touch display device according to claim 7, wherein
a plurality of the touch detection pins are arranged in a first direction, and are adjacent to and staggered with the first control pins, and the first direction intersects with a direction from the display area to the bonding area; and
a plurality of the bonding pins are arranged in the first direction, are connected one-to-one to the touch detection pins, and are adjacent to and staggered with the second control pins.

10. The touch display device according to claim 7, wherein the first control pins are same as the touch detection pins, and the bonding pins are same as the second control pins.

11. The touch display device according to claim 7, wherein in the first direction, a plurality of the first control pins are located on opposite sides of a plurality of the touch detection pins, and a plurality of the second control pins are located on opposite sides of a plurality of the bonding pins.

12. The touch display device according to claim 7, wherein
the touch display panel further comprises a plurality of third redundant pins arranged in a second direction and arranged in a row with the first control pins, and the second direction is parallel to a direction from the display area to the bonding area; and
the touch display chip further comprises a plurality of fourth redundant pins arranged in the second direction, connected one-to-one to the third redundant pins, and arranged in a row with the second control pins.

13. The touch display device according to claim 7, wherein
the touch display panel further comprises a plurality of third redundant pins arranged in a second direction, and adjacent to and staggered with the first control pins, and the second direction is parallel to a direction from the display area to the bonding area; and
the touch display chip further comprises a plurality of fourth redundant pins arranged in the second direction, connected one-to-one to the third redundant pins, and adjacent to and staggered with the second control pins.

14. The touch display device according to claim 1, wherein when the touch display device is in a working state, the control signal lines transmit a constant voltage signal to the demultiplexing units, and the demultiplexing units are in an off state according to the constant voltage signal.

15. The touch display device according to claim 14, wherein the constant voltage signal is a power supply voltage signal.

16. The touch display device according to claim 1, wherein the touch display panel further comprises one or more pressure-bonding detection pin groups located in the bonding area, and each of the pressure-bonding detection pin groups comprises two pressure-bonding detection pins arranged in a row and connected to each other.

17. The touch display device according to claim 16, wherein the touch detection pins are not disposed between two pressure-bonding detection pins in each group of the pressure-bonding detection pins.

18. The touch display device according to claim 16, wherein the touch detection pins are disposed between two pressure-bonding detection pins in each group of the pressure-bonding detection pins.

19. The touch display device according to claim 16, wherein two pressure-bonding detection pins in each group of the pressure-bonding detection pins and the one or more touch detection pins are arranged in a row in a first direction, and the first direction intersects with a direction from the display area to the bonding area.

20. A touch display device, comprising:

a touch display panel comprising a display area and a bonding area, and further comprising:

a plurality of touch units located in the display area;

a plurality of first touch pins located in the bonding area;

a plurality of touch signal lines connecting the touch units to the first touch pins; and one or more touch detection pins located in the bonding area and connected to the first touch pins; and a touch display chip disposed in the bonding area and comprising:

a plurality of second touch pins corresponding to and connected to the first touch pins; and one or more bonding pins corresponding to and connected to the one or more touch detection pins;

wherein the touch display panel further comprises one or more pressure-bonding detection pin groups located in the bonding area, and each of the pressure-bonding detection pin groups comprises two pressure-bonding detection pins arranged in a row and connected to each other.

* * * * *